United States Patent [19]

Ingle

[11] 4,024,351
[45] May 17, 1977

[54] TELEPHONE LINE BATTERY BOOST CIRCUIT

[75] Inventor: Edwin Coy Ingle, Julian, N.C.

[73] Assignee: Bell Telephone Laboratories, Incorporated, Murray Hill, N.J.

[22] Filed: Jan. 26, 1976

[21] Appl. No.: 652,051

[52] U.S. Cl. .............................................. 179/16 F
[51] Int. Cl.² ......................................... H04Q 1/30
[58] Field of Search ...................... 179/16 EA, 16 F

[56] References Cited

UNITED STATES PATENTS

| | | | |
|---|---|---|---|
| 3,781,480 | 12/1973 | Roge | 179/16 F |
| 3,852,536 | 12/1974 | Chambers, Jr. | 179/16 F |
| 3,898,389 | 8/1975 | Hanneman et al. | 179/16 F |
| 3,906,162 | 9/1975 | Sparrevohn | 179/16 F |

Primary Examiner—Kathleen H. Claffy
Assistant Examiner—Randall P. Myers
Attorney, Agent, or Firm—Thomas Stafford

[57] ABSTRACT

Transmission and signaling range of a telephone transmission line is extended by controllably inserting boost potentials into the line to series aid an applied central office battery. Insertion of the potentials is realized by sensing the direction of current flow in the line and switching a corresponding potential into the line. Optical isolators, each including a light emitting diode and phototransistor, are advantageously employed as line current sensors and switching elements. Insertion of boost potential into the line is controllably delayed in response to changes in the direction of current flow caused by apparent reversals in the polarity of the applied central office battery.

15 Claims, 3 Drawing Figures

TELEPHONE LINE BATTERY BOOST CIRCUIT

BACKGROUND OF THE INVENTION

This invention relates to telephone systems and, more particularly, to range extenders for improving signaling and transmission on communications channels.

Numerous communications channels, for example, telephone transmission lines, consist of a twisted pair of leads. Signaling and transmission range of such transmission lines is limited by attenuation caused by the line resistance. The longer the line the greater the attenuation and, hence, the greater the distortion of telephone signaling and transmission.

Basically, signaling is the transfer of nonvoice information that controls processing of a telephone call, for example, signaling includes supervision, dial pulsing, ringing, ring-trip, etc. The basic signaling problem in long transmission lines is that there may not be sufficient line current to assure operation of central office detection circuits, for example, relays and the like. Similarly, the basic transmission problem is loss of transmitter efficiency because of low "talk" battery current, i.e., low loop current. Various solutions have been proposed to overcome these difficulties.

One particularly advantageous solution to the line signaling and transmission problems is the central office battery boost voltage insertion circuit disclosed in U.S. application Ser. No. 571,868, filed April 25, 1975, now U.S. Pat. No. 3,992,591. Basically, the direction of current flow in a transmission line in response to a central office battery potential applied to the transmission line is detected and a potential is inserted in the line to series aid the central office battery. Equal amplitude potentials are inserted in both leads of the line in order to maintain longitudinal balance of the line impedance. Optical isolators, each including a light emitting diode and a corresponding phototransistor, are employed to detect the direction of current flow and to switch appropriate boost potentials into the line. Use of light emitting diodes and phototransistors eliminates biasing problems encountered in prior conventional transistor boost circuits. Additionally, since the phototransistors employed to insert the boost potentials in each lead of the transmission line are of the same conductivity type, the impedance inserted into each lead is substantially the same and, hence, longitudinal balance is maintained.

Notwithstanding the advances in design of battery boost potential insertion circuits, the prior known circuits still have some shortcomings. Problems arise in some of the prior battery boost circuits because of their rapid response to changes in the direction of current flow in the transmission line caused by apparent changes in the polarity of the central office battery potential applied to the line. This rapid response causes erroneous reversals in the polarity of the inserted boost potential or potentials in response to noise, switching transients and the like. Consequently, the boost insertion circuit tends to "oscillate", thereby destroying signaling and degrading voice transmission. This is extremely undesirable.

Another problem with prior known boost potential insertion circuits relates to the insertion of boost potential during intervals that a ringing signal is applied to the line. Since the ringing signal is an alternating (AC) signal having a relatively large amplitude, the polarity of the combined signal applied to the ring lead of the transmission line will alternate during each cycle of the ringing signal. Therefore, if not provided for, the polarity of the inserted boost potential will also alternate during each cycle of the ringing signal. In certain prior art circuits, reversals of the boost potential polarity are avoided by providing alternate circuit paths to shunt the ringing signal around the boost insertion circuit. Many of these prior circuits employ complex switching arrangements for providing the alternate paths which effectively remove the boost potential from the transmission line during the ringing interval. Other circuits disable the boost circuit during the entire ringing interval, while in still other circuits large value capacitors are used to by-pass the ringing and other AC signals around the boost insertion circuit. In the above-noted application, Ser. No. 571,868, now U.S. Pat. No. 3,992,591 insertion of potential into the line is inhibited only during a portion of each cycle of the ringing signal in which the polarity of the combined DC and AC signal applied to the ring lead is positive. Therefore, boost potential is provided to series aid the central office battery during portions of each cycle of the ringing signal. This inhibiting insertion of the boost potential is realized by employing an optical isolator to disable a current sensor which would normally detect current flow in the direction opposite to that caused by the applied central office potential during the ringing interval. Although these solutions to the problem of inserting boost potential during intervals that a ringing signal is applied to the line may be satisfactory for certain applications, they are unsatisfactory for others.

SUMMARY OF THE INVENTION

These and other problems are resolved in accordance with the inventive principles to be described herein in relation to a current direction sensitive transmission line battery boost arrangement by controllably delaying insertion of boost potential or potentials into the transmission line in response to changes in the direction of current flow caused by apparent reversals in the polarity of the central office battery potential applied to the line.

In one embodiment, the desired insertion delay is realized by advantageously employing time delay circuits in conjunction with a memory unit so that insertion of boost potential or potentials is delayed only when there is a reversal in the direction of current flowing in the line. That is to say, if the current direction presently detected is the same as the last previously detected direction of current flow there is no delay in inserting boost potential into the line. Each of the delay circuits is associated with current sensors for detecting current flow in a predetermined direction in the line. Specifically, the delay circuits set the memory unit to either one of first or second stable states, depending on the direction of current flow in the line. Switch enable circuits associated with the memory unit and delay circuits are operative in response to the state of the memory unit and the output from the current sensors for enabling associated switch elements to connect appropriate potential or potentials into the line to series aid the detected current flow. Energization of the switch enabling circuits is delayed, or not, depending on the present state of the memory unit.

Another aspect of the invention relates to insertion of boost potential into the transmission line during application of a ringing signal to the line. It is undesirable to have a reversal in the polarity of the inserted potential or potentials during the ringing interval in response to a reversal in the direction of the current flow in the line caused by alternating positive and negative transitions of the ringing signal. This polarity reversal of the inserted potentials is avoided, in accordance with an aspect of the invention, by controllably disabling the delay circuit associated with the current sensors which would normally detect current flow in a direction opposite to the current flow caused by the central office battery applied to the line during the ringing interval so that the associated switch enable circuit cannot be energized. Consequently, potentials which series aid the applied central office battery potential are controllably insertable into the line during a portion of each cycle of the ringing signal while potentials which would effectively buck or oppose the applied central office battery potential are inhibited from being inserted into the line during application of the ringing signal to the line.

BRIEF DESCRIPTION OF THE DRAWINGS

These and other objects and advantages of the invention will be more fully understood in the following detailed description of an embodiment of the invention taken in accordance with the appended drawings in which.

DETAILED DESCRIPTION

Figure 1:
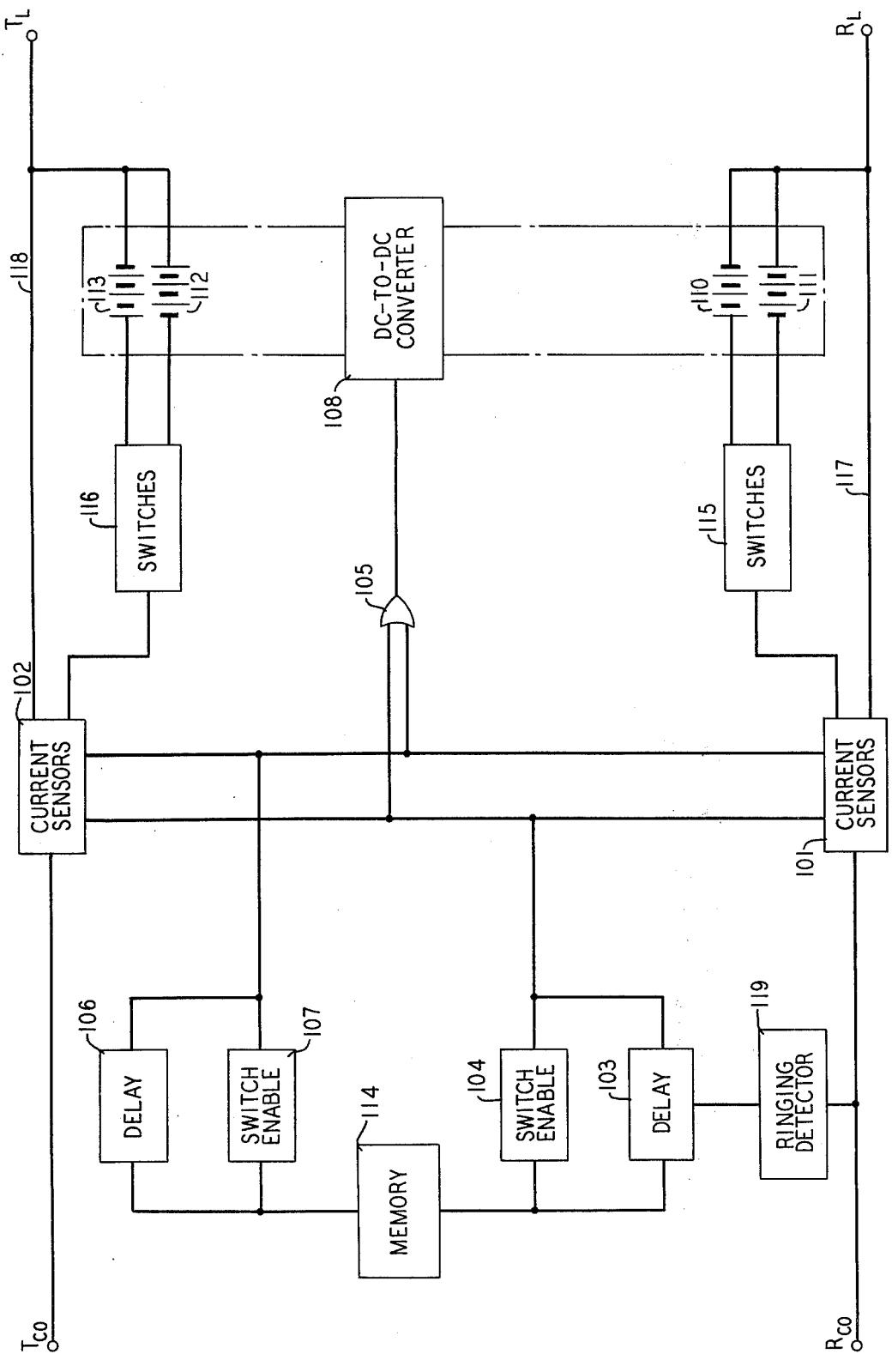
FIG. 1 shows a simplified block diagram of a central office battery boost potential insertion arrangement illustrating an embodiment of the invention, and FIGS. 2A and 2B assembled as shown in FIG. 2 depict details of the transmission line boost potential insertion arrangement of FIG. 1.

FIG. 1 shows in simplified form a transmission line range extender of the so-called current direction sensitive boost potential insertion type. As is well known, a telephone transmission line may consist of a twisted pair of leads, one of the leads being designated the tip (T) lead and the other lead being designated the ring (R) lead. At a central office (CO) potentials are applied to the tip and ring leads for purposes of signal transmission and signaling. In the course of signaling, the relative polarity of the potential applied across the tip and ring leads may be reversed. Additionally, during the ringing interval, and AC signal is superimposed on the applied DC potential. The signaling potentials are applied to the terminals of the range extender (FIG. 1) designated $T_{CO}$ and $R_{CO}$ corresponding to the tip and ring leads, respectively, of the transmission line. Range extenders are generally used in transmission lines typically employed to connect a subscriber to a central office. Such lines have come to be known as subscriber loops. On occasion, range extenders may also be employed in lines used for voice transmission between central offices. These lines will also be considered loops. Thus, the range extender terminals designated $T_L$ and $R_L$ are connected to the so-called subscriber loop and, hence, to the subscriber station equipment.

In order to enhance transmission quality and to operate devices at the central office, for example, relays and the like which are employed to detect operative states of the subscriber station equipment, it is important that there is sufficient current flow in the transmission line or loop. In long lines, the impedance of the line may attenuate the current from the central office battery to such a degree that the detecting devices do not respond properly to operative states of the subscriber station equipment. To avoid this detection problem, and to improve transmission quality, a potential or potentials are controllably inserted into the tip and/or ring leads of the transmission line to series aid the applied central office battery potential.

Referring again to FIG. 1, there are shown elements for controllably inserting boost potential in both the tip (T) lead and ring (R) lead of a transmission line. Accordingly, current sensors 101 and 102 are employed to detect the instantaneous direction of current flow in the ring and tip leads, respectively, of a transmission line connected to the subject range extender. Outputs from current sensors 101 and 102, representative of current flow in a first direction in the line, are supplied to delay 103, switch enable 104, and one input of OR gate 105. Similarly, outputs from current sensors 101 and 102, representative of current flow in a second direction in the line opposite to the first, are supplied to delay 106, switch enable 107, and a second input of OR gate 105. An output from OR gate 105 is operative to enable DC-to-DC converter 108 for generating boost potentials 110, 111, 112 and 113. Circuit paths 117 and 118 provide conductive paths for current sensors 101 and 102, respectively, so that the direction of current flow in the ring and tip leads may be sensed. Memory 114 is connected in circuit with delay units 103 and 106 and switch enable units 104 and 107. Switch enable 104 is operative to control associated elements in switches 115 and 116 for inserting appropriate boost potentials into the tip and ring leads to series aid central office battery potential applied to terminals $T_{CO}$ and $R_{CO}$ having a first polarity, for example, potentials 111 and 113. Similarly, switch enable 107 is operative to control associated elements in switches 115 and 116 for controllably inserting appropriate boost potentials into the ring and tip leads to series aid an applied central office battery potential applied to terminals $T_{CO}$ and $R_{CO}$ having a second polarity opposite to the first polarity, for example, potentials 110 and 112, respectively. Memory unit 114 is operative in conjunction with delay units 103 and 106 and switch enable units 104 and 107, in accordance with one aspect of the invention, for controllably delaying operation of associated elements in switches 115 and 116 and, hence, controllably delaying insertion of boost potential into the line in response to changes in the direction of current flow into line detected by current sensors 101 and 102 caused by apparent reversals in the polarity of the applied central office battery potential. These apparent reversals in the central office battery may be caused by switching transients, noise, or the like, on the transmission line. More specifically, dependent on the present state of memory 114, a conductive path either is or is not provided for enabling either switch enable 104 or switch enable 107, without or with delay, respectively, in response to the outputs from current sensors 101 and 102. That is to say, when memory 114 is in a first state, a conductive path is provided for enabling switch enable 104 without delay, and not for enabling switch enable 107. Consequently, switch enable 104 is capable, in response to appropriate outputs from current sensors 101 and 102, to operate immediately associated switching elements in switches 115 and 116 for inserting potentials 111 and 113 into the line. However, operation of switch enable 107, in response to corresponding outputs from current sensors 101 and/or 102, is delayed for a prescribed time interval by delay 106.

At the termination of the delay interval, memory 114 is set to a second prescribed state thereby providing a conductive path for enabling switch enable 107. Consequently, switch enable 107 is capable of being enabled without delay while switch enable 104 would be delayed in a manner described above in relation to switch enable 107. Simply stated, insertion of potential into the transmission line is delayed only when the presently detected direction of current flow in the line is different from the last previously detected direction of current flow as indicated by the conductive state of memory 114.

In operation a central office (CO) battery potential is applied to terminals $T_{CO}$ and $R_{CO}$. Thus, with a CO potential connected to terminals $R_{CO}$ and $R_{CO}$ poled so that $R_{CO}$ is negative relative to $T_{CO}$, and with a so-called off-hook condition of the subscriber equipment, i.e., essentially a short circuit across the loop connected to terminals $T_L$ and $R_L$, current flow in the transmission line is in a direction from $T_{CO}$ to $T_L$ and from $R_L$ to $R_{CO}$, commonly referred to as the normal flow of curent. Consequently, current sensors in units 101 and 102 cause switch enable 104 to enable associated elements in switches 115 and 116 for inserting source 112 in the tip lead and source 110 in the ring lead, thereby series aiding the central offfice battery potential applied to terminals $R_{CO}$ and $R_{CO}$. Upon reversal in the polarity of the central office battery potential, i.e., $R_{CO}$ positive relative to $T_{CO}$, and with an off-hook condition of the subscriber station equipment, current flow is in a direction from $R_{CO}$ to $R_L$ and from $T_L$ to $T_{CO}$, the so-called reverse direction of current flow. Consequently, current sensors in units 101 and 102 cause switch enable 107, after a prescribed delay interval imposed by delay 106 and memory 114 to enable associated elements in switches 115 and 116 for inserting source 113 into the tip lead and source 111 into the ring lead, again series aiding the applied central office battery potential. Upon termination of the delay interval, memory 114 is set to a prescribed state so that re-energization of switch 107 would not be delayed if the current flow in the line the next time energized is still in the so-called reverse direction. If the current flow upon re-energization is again reversed to be in the normal flow direction, switch enable 104 is delayed by delay 103 and memory 114 for the prescribed delay interval. This process is iterated for each reversal in the direction of current flow to insure that the polarity of the boost potential or potentials to be inserted in the line is not erroneously reversed in response to switching transients, noise signals, or the like.

It is important that the magnitude of the inserted boost potential not be greater than the central office battery potential to insure that current flow in the line is determined by the applied central office battery and not by the inserted boost potential or potentials. In an example from practice, the magnitude of potentials 110 through 113 has been set at approximately 12 volts for a total inserted potential of 24 volts and the magnitude of the central office battery potential is typically 48 volts.

During the ring interval, i.e., when a ringing signal is being supplied via a transmission line to a subscriber station equipment, a negative CO battery potential is usually applied to terminal $R_{CO}$ and an AC signal hving a predetermined amplitude and frequency is intermittently superimposed thereon in well-knonw fashion. In an example from practice, ringing is realized by applying a negative 48-volt central office battery potential to terminal $R_{CO}$ and superimposing an 88-volt RMS AC ringing signal thereon. Thus, the combined signal applied to terminal $R_{CO}$ includes both negative and positive transitions during alternate cycles of the ringing signal. Since a negative central office battery potential is applied, only sources 110 and 112 should be inserted into the line to series aid the central office potential. However, the momentary positive transitions of the combined signal applied to terminal $R_{CO}$ appears to the range extender as reversals in the polarity of the applied central office potential. Consequently, current sensors 101 and 102 would normally cause a reversal in the polarity of the potentials inserted into the line. Any such polarity reversal in the inserted potentials is undesirable because the inserted potentials would effectively buck the applied central office potential and possibly cause signaling errors. This possible reversal in the polarity of the inserted potentials during ringing is avoided in accordance with an aspect of the invention by employing ringing detector 119 to detect that an AC ringing signal is applied to $R_{CO}$ and to disable delay 103 and, hence, switch enable 104 during the ringing interval. In this example, disabling of switch enable 104 and, consequently, the associated elements in switches 115 and 116, inhibits the insertion of potentials 111 and 113 into the line.

Figures 2, 2A:
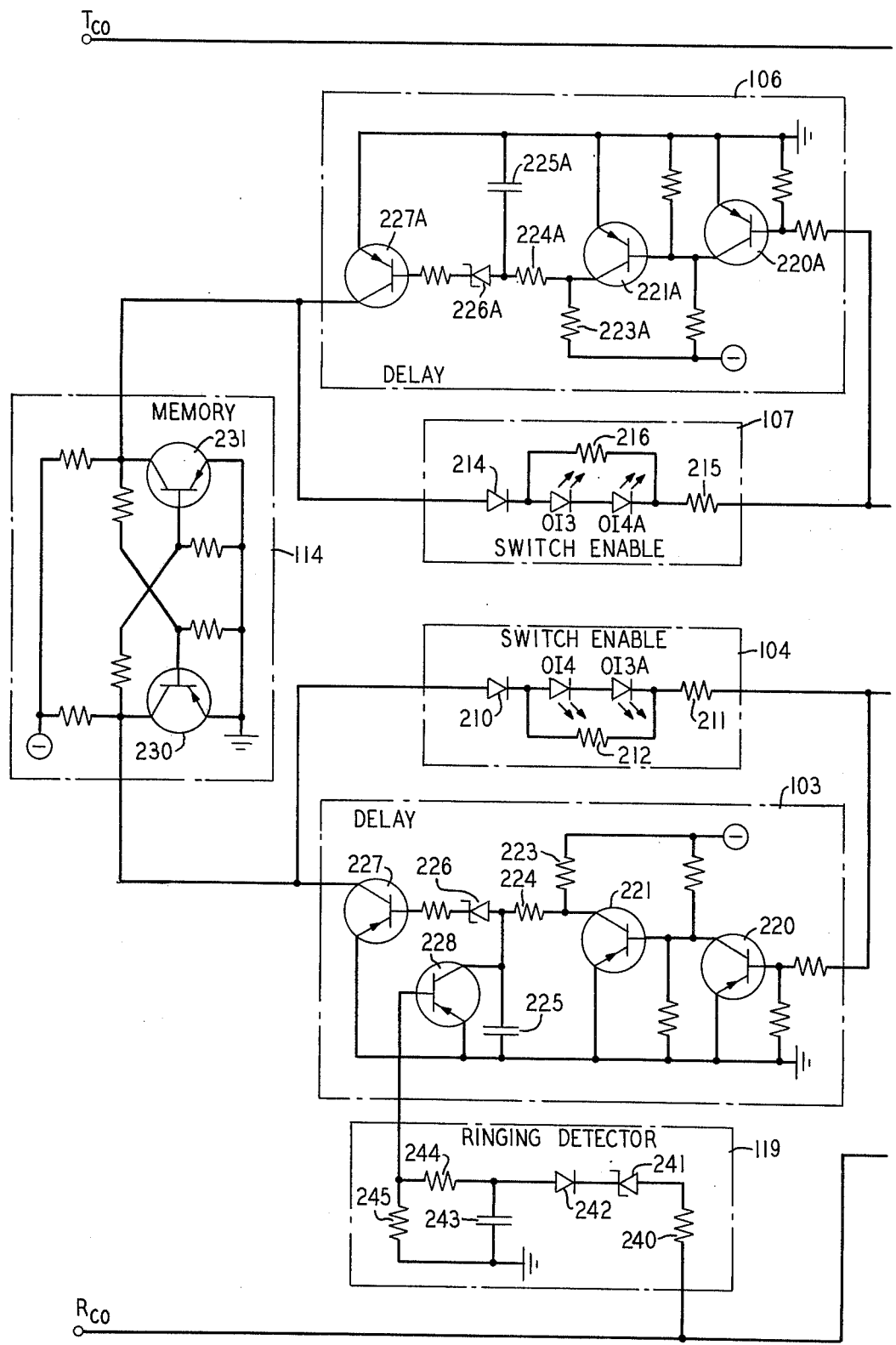
Figure 2B:
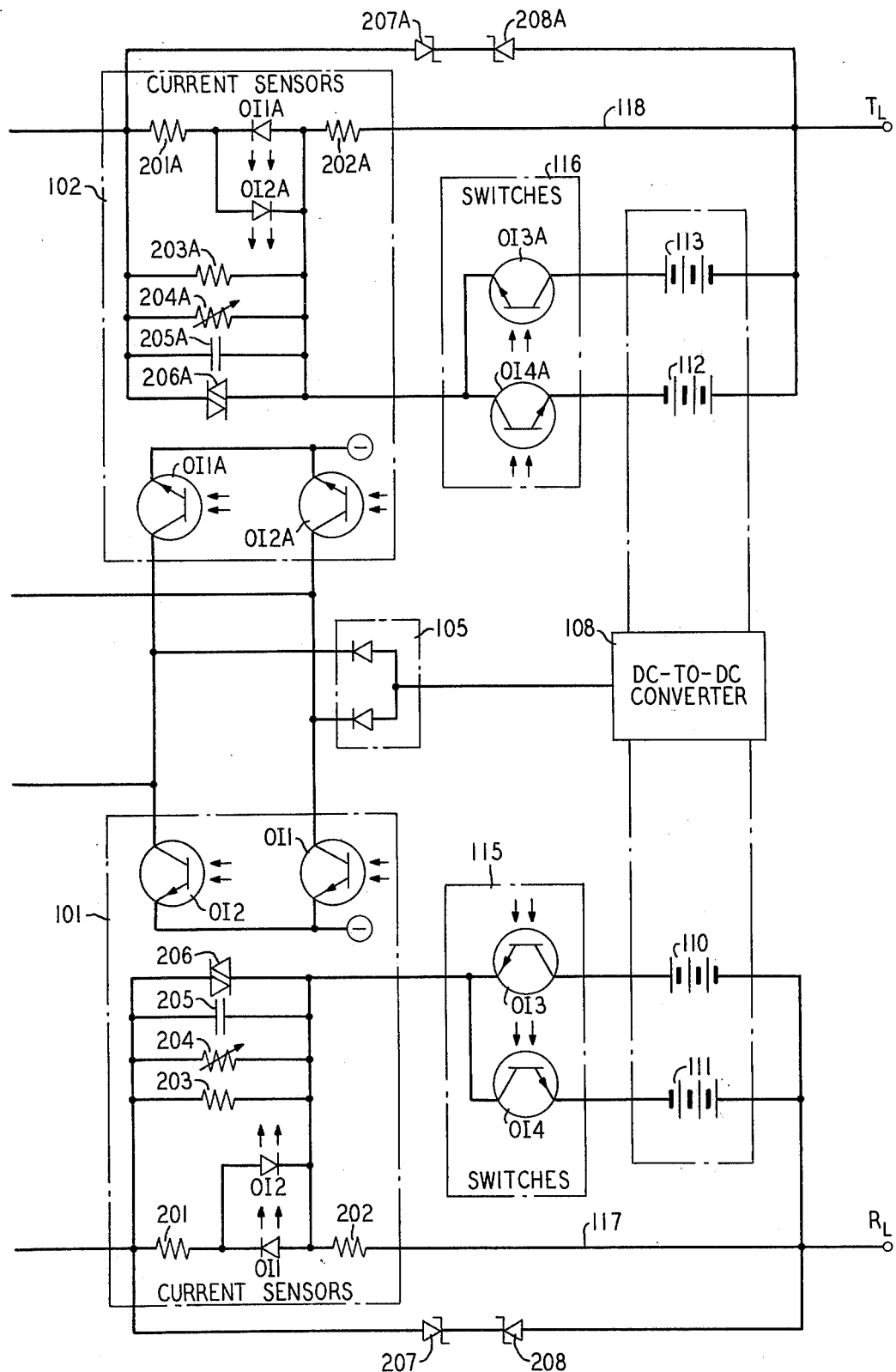

FIGS. 2A and 2B when assembled as shown in FIG. 2 show details of one embodiment of a transmission line range extender of the current sensitive boost potential insertion type which illustrates the instant invention. The purpose of this embodiment of the instant invention is basically to insert controllably potentials into the tip and ring leads of a transmission line to series aid a central office battery potential applied across the tip and ring leads. The circuit arrangement employed to effect the desired controllable insertion of potentials into the ring lead is substantially identical to that employed to insert the potentials into the tip lead except for some notable differences which are explained below. Circuit components employed in the circuit arrangement in the ring lead and circuit components employed in the circuit arrangement in the tip lead which are similar and perform similar functions are similarly numbered, with the tip lead components being designated "A". Additionally, elements in FIGS. 2A and 2B which perform the same function as the elements depicted in FIG. 1 have been similarly numbered.

Referring now to FIGS. 2A and 2B, terminals $T_{CO}$ and $R_{CO}$ of the range extender are connected to the central office tip and ring leads, respectively, of a transmission line and terminals $T_L$ and $R_L$ are connected to the subscriber line or loop tip and ring leads, respectively, of a transmission line. Boost potentials 110, 111, 112 and 113 are generated in well-known fashion by employing DC-to-DC converter 108. During idle intervals, i.e., when no current is flowing in the transmission line, converter 108 is inhibited. During intervals that current flow is detected converter 108 is enabled via OR gate 105. Appropriate ones of potentials 110, 111, 112 and 113 are selectively controllably insertable into the transmission line to series aid a central office battery potential applied to terminals $R_{CO}$ and $R_{CO}$. Thus, with a potential applied to $R_{CO}$ having a negative polarity relative to $T_{CO}$ current flow is from $T_{CO}$ to $T_L$ and from $R_L$ to $R_{CO}$ and potentials 112 and 110 should be inserted into the tip and ring leads, respectively, of the line to series aid the current flow caused by the CO potential. Similarly, with a CO potential applied to $R_{CO}$ and $R_{CO}$ having a positive polarity relative to $T_{CO}$, i.e., reverse battery condition, current flow is normally from $R_{CO}$ to $R_L$ and from $R_L$ to $T_{CO}$ and potentials 111 and 113 should be inserted into the ring and tip leads, respectively, of the line to series aid the applied CO potential.

The circuit arrangement associated with the ring lead will be considered first. Current flow in the ring lead is detected by current sensors 101. Circuit components used in sensors 101 include optical isolators OI1 and OI2, each including a radiant energy emitting element and a radiant energy responsive element, resistors 201, 202, 203 and 204, capacitor 205 and variolosser 206. In this example, optical isolators OI1 and OI2 each include a light emitting diode (LED) and an associated phototransistor arranged in predetermined spatial relationship, i.e., packaged to form a single element now common in the art. Circuit paths for sensing the direction of current flow in the ring lead include the series connection of current limiting resistor 201, either LED OI1 or LED OI2, resistor 202 and circuit path 117. The parallel combination of resistor 203, variable resistor 204 and variolosser 206 connected across the series connection of resistor 201 and LEDs OI1 and OI2 is employed to provide a circuit path for line current when boost potential is inserted, limit current passing through the LEDs and adjust the sensitivity of the current sensing paths in a manner which will be apparent to those skilled in the art. Resistor 204 may, in practice, be a plurality of resistors each of which may be switched into the circuit for setting a threshold level for current detection as desired. Capacitor 205 is employed to filter noise signals and other impulse signals in well-known fashion.

For current flow in a so-called normal direction in the ring lead, i.e., from $R_L$ to $R_{CO}$, which exceeds the detection threshold level of current sensors 101, LED OI1 is operative to emit radiant energy thereby causing associated phototransistor OI1 to conduct. Similarly, for current flow in a so-called reverse direction in the ring lead, i.e., from $R_{CO}$ to $R_L$, of a magnitude whih exceeds the detection threshold of sensors 101, LED OI2 is operative to emit radiant energy causing corresponding phototransistor OI2 to conduct. Operation of phototransistors OI1 and OI2 is discussed in greater detail below.

Switches 115 include radiant energy responsive elements for controllably connecting either potential 110 or 111 in circuit in the ring lead. In this example, radiant energy responsive elements, namely phototransistors OI3 and OI4 are employed controllably to provide circuit paths for inserting boost potentials 110 and 111, respectively, into the ring lead. With boost potential inserted into the line, the majority of current flowing into the ring lead will be conducted through variolosser 206.

Zener diodes 207 and 208 are connected in a so-called back-to-back configuration between terminals $R_{CO}$ and $R_L$ and are utilized to provide surge protection in well-known fashion. Additionally, the zener diodes provide a conductive path for ringing signals during intervals that insertion of boost potential is inhibited.

Since phototransistors OI3 and OI4 are of the same conductivity type, in this example NPN type, and since the current sensing and line current conductive paths for insertion of each polarity of boost potential are essentially identical, the impedance inserted into the ring lead for each polarity of boost potential is substantially the same.

The boost potential insertion arrangement associated with the tip lead of the transmission line operates in a manner essentially identical to the ring lead insertion circuit and consequently will not be discussed in detail. It is noted that switches 116 include phototransistors OI3A and OI4A for providing conductive paths to insert boost potentials 113 and 112, respectively. Here again, phototransistors OI3A and OI4A are of the same conductivity type as OI3 and OI4. Therefore, the impedance inserted in the tip lead when inserting potential to assist current flow in each direction is substantially the same as that inserted in the ring lead and, consequently, longitudinal balance of the line is maintained.

Elements of switches 115 and 116, namely phototransistors OI3 and OI4, and OI3A and OI4A, respectively, are controlled by switch enable units 104 and 107. Specifically, switch enable 104 includes a series connection of LED OI4, LED OI3A, breakdown protection diode 210, and current limiting resistor 211. Resistor 212, connected in parallel with the series connection of LEDs OI4 and OI3A, is employed to bypass leakage current around the LEDs thereby insuring that they are not energized erroneously.

Since switch enable 104 includes LEDs OI3A and OI4, it is operative to enable corresponding switching phototransistors OI3A and OI4 for controlling insertion of boost potentials 113 and 111 in the tip and ring leads, respectively. Similarly, switch enable 107 includes a series connection of LEDs OI3 and OI4A, breakdown protection diode 214 and current limiting resistor 215. Again, resistor 216, connected in parallel across LEDs OI3 and OI4A, is also employed to bypass leakage current around the LEDs to ensure proper energization. LEDs OI3 and OI4A are operative to enable corresponding switching phototransistors OI3 and OI4A for controlling insertion of boost potentials 110 and 112 in the ring and tip leads, respectively.

Memory 114, in this example, is a bistable multivibrator including transistors 230 and 231 and associated circuit elements arranged in a circuit configuration now well-known in the art. Transistor 230 is connected in circuit with switch enable 104 and delay 103, and is operative to provide or not a conductive path for enabling switch enable 104. Similarly, transistor 231 is connected in circuit relationship with switch enable 107 and delay 106, and is operative to provide or not a conductive path for controllably enabling switch enable 107. Specifically, when transistor 230 is ON and transistor 231 is OFF a conductive path is provided for enabling switch enable 104 substantially without delay, while enabling of switch enable 107 is delayed. Similarly, when transistor 231 in ON and transistor 230 is OFF switch enable 107 is enabled substantially without delay while switch enable 104 is delayed until a conductive path is provided by delay 103.

Delay 103 is a timing circuit for providing a prescribed delay interval in response to a continuous energizing potential, for example, the negative potential supplied via either phototransistor OI2 or phototransistor OI1A, in response to light emitted from LED OI1A or LED OI2, respectively. Delay 103 includes gate transistor 220, which is normally OFF; timing transistor 221, which is normally ON; resistors 223 and 224 for establishing a charge time constant for capacitor 225; zener diode 226; and gate transistor 227, which is normally OFF. Transistor 228 shunting capacitor 225 is utilized to disable delay 103 during ringing intervals and will be explained below. Operation of delay 103 is straightforward. When a continuous negative potential is supplied via either phototransistor OI2 or phototransistor OI1A indicating detection of a reverse current flow in the line, transistor 220 is turned ON. This, in turn, causes transistor 221 to be turned OFF, thereby allowing capacitor 225 to charge through the series connection of resistors 223 and 224. Once the potential developed across capacitor 225 exceeds a prescribed threshold level establishment by zener diode 226 and the base-to-emitter junction potential of transistor 227, transistor 227 is turned ON, thereby providing a conductive path for enabling switch enable 104. When transistor 227 is conducting transistor 230 of memory 114 is also turned ON. Consequently, memory 114 is set to a first prescribed stable state representative of the detected direction of current flow and, consequently of the polarity of boost potential inserted into the line. Should the potential supplied to delay 103 by terminated or otherwise interrupted during the prescribed delay interval, transistor 220 is turned OFF, thereby turning ON transistor 221 which, in turn, provides a discharge path for capacitor 225 via resistor 224. The discharge time constant is set at a value much shorter than the charging time constant. Consequently, capacitor 225 will discharge fairly rapidly and, hence, the circuit is relatively insensitive to noise bursts and other transient signals. That is to say, delay 103 yields a predetermined output only when an energizing potential is continuously applied for an interval which exceeds the prescribed delay interval. When the energizing potential is interrupted or terminated the timing interval of delay 103 in reinitiated. In an example from experimental evaluation charging and discharging time constants of 15 milliseconds and 0.2 milliseconds, respectively, seem to provide adequate circuit operation. The un-numbered resistors in delay 103 are employed for biasing and/or current limiting as will be apparent to those skilled in the art.

Delay 106 is essentially identical to delay 103 except for the absence of transistor 228. Therefore, details of operation of delay 106 in providing a conductive path for enabling switch enable 107 in setting memory 114 to a second prescribed stable state will not be discussed in detail since its operation will be apparent to those skilled in the art. Circuit elements which function essentially identical to those in delay 103 have been similarly numbered and designated "A". Thus, delay 107 responds to a negative potential supplied via either phototransistor OI1 or phototransistor OI2A in response to light emitted from LED OI1 or LED OI2A, respectively, indicating detection of current flow in the normal direction in the line, for delaying enabling of switch enable 107. At the termination of the delay interval transistor 231 is turned ON by transistor 227A and memory 114 is set to a second prescribed stable state.

Ringing detector 119 is employed to ensure against reversal in the polarity of the inserted boost potentials during intervals that a ringing signal is applied to the ring lead of the transmission line. Accordingly, ringing detector 119 includes limiting resistor 240, zener diode 241, blocking diode 242, capacitor 243 and resistors 244 and 245. Zener diode 241 is selected to have a predetermined breakdown voltage, for example, 100 volts, in order to detect that a ringing signal has been applied to the ring lead of the transmission line. Blocking diode 242 is poled to pass only negative potential applied to $R_{CO}$. Thus, when the combined negative signal, i.e., battery plus ringing, applied to $R_{CO}$ exceeds 100 volts, zener diode 241 breaks down and capacitor 243 is charged via resistor 240, zener 241 and diode 242 to a negative potential. The negative potential developed across capacitor 243 is supplied via resistor 244 to the base terminal of transistor 228, thereby causing transistor 228 to conduct. The discharge time constant of capacitor 243 is set at a value so that transistor 228 remains ON during the entire ringing interval. Transistor 228 provides a conductive path effectively to short circuit capacitor 225 of delay 103. Consequently, transistor 227 remains OFF and, hence, no conductive path is provided to enable switch enable 104 during the ringing interval. It should be noted that during ringing a negative CO potential is applied to $R_{CO}$ and current flow is in the normal direction. Therefore, memory 114 is set so that transistor 230 is OFF. Thus, ringing detector 119 is operative, in accordance with an aspect of the invention, to disable delay 103 thereby ensuring that switching phototransistors OI3A and OI4 are disabled and potentials 111 and 113 cannot be inserted into the transmission line to reverse the polarity of the desired boost potential during ringing intervals.

In operation, assuming current flow is in the so-called reverse direction in either the ring or tip leads, i.e., either from $R_{CO}$ to $R_L$ or from $T_L$ to $T_{CO}$, LED OI2 in current sensors 101 and/or LED OI1A in current sensors 102 emit radiant energy of sufficient magnitude for enabling associated phototransistor OI2 and/or OI1A to conduct. When conducting either phototransistor OI2 or OI1A supplies a negative potential or predetermined magnitude to one input of OR gate 105, switch enable 104 and delay 103. OR gate 105, which may simply include diodes connected to provide the OR function and poled to pass a negative potential, yields an output for enabling converter 108 in a manner which will be apparent to those skilled in the art.

Assuming for the moment that memory 114 is in a first prescribed stable state, for example, transistor 230 ON and transistor 231 OFF, a conductive path is provided via transistor 230 for energizing switch enable 104 substantially without delay. Consequently, LEDs OI4 and OI3A of switch enable 104 are energized and emit radiant energy substantially without delay in response to the negative potential supplied by phototransistor OI2 and/or OI1A. In turn, phototransistors OI4 and OI3A in switching elements 115 and 116, respectively, and associated in a predetermined spatial relationship with LEDs OI4 and OI3A, respond to the emitted radiant energy for providing conductive paths to insert both boost potentials 111 and 113 in the ring and tip leads, respectively. Note that current flow need only be detected in either the ring lead or tip lead in order to controllably insert boost potentials in both leads. Thus, current need be detected in only one lead for inserting boost potentials in both leads to series aid the detected current flow.

Now assuming current flow is in the so-called normal direction, i.e., from $R_L$ to $R_{CO}$ or from $T_{CO}$ to $T_L$, and transistor 231 of memory 114 is ON. That is to say, memory 114 is in a second prescribed stable state. Isolator OI1 and/or OI2A is operative to pass a negative potential to a second input of OR gate 105, switch enable 107 and dleay 106. Again, OR gate 105 enables converter 108, while LEDs OI3 and OI4A of switch enable 107 respond to the supplied negative potential substantially without delay to emit radiant energy for enabling associated phototransistors OI3 and OI4A in switches 115 and 116, respectively, to provide conductive paths for inserting boost potentials 110 and 112 into the ring and tip leads, respectively.

Assuming now that the memory 114 is in a state which indicates that a reversal in the direction of current flow is being detected. For example, assume transistor 230 is OFF and that current flow in the line is presently in the reverse direction. Then, optical isolator OI2 and/or OI1A is operative to supply a negative potential to switch enable 104, delay 103 and OR gate 105. Since transistor 230 of memory 114 is OFF and transistor 227 of delay 103 is normally OFF, no conductive path is provided for immediate energization of LEDs OI4 and OI3A of switch enable 104. Upon delay 103 "timing-out", transistor 227 is turned ON thereby providing a conductive path for energizing LEDs OI4 and OI3A, and also causing memory 114 to be set to its first prescribed stable state. That is, transistor 230 of memory 114 is turned ON and transistor 231 is turned OFF. If the presently detected current flow is caused by switching transients, noise or the like, the current detected will be of relatively short duration and, consequently, delay 103 will not time-out to provide the necessary conductive path for enabling LEDs OI4 and OI3A of switch enable 104. Therefore, switch enable 104 and corresponding switching elements in switches 115 and 116 are controllably disabled during intervals of transient current conditions on the line, thereby preventing, in accordance with an aspect of the invention, reversals in the polarity of the desired boost potentials to be inserted into the line.

For instances that memory 114 is initially in its first stable state, i.e., transistor 230 ON and transistor 231 OFF, and with the presently detected current flow in the line being in the normal direction, indicating a reversal from the last detected current flow, energization of switch enable 107 is delayed by delay 106 in a manner identical to that described above relating to switch enable 104 and delay 103.

The above-described arrangements are, of course, merely illustrative of an application of the principles of the invention. Numerous other arrangements may be devised by those skilled in the art without departing from the spirit and scope of the invention. For example, although the instant invention has been described utilizing optical couplers for effecting current detection and switching of boost potentials into a transmission line, other detection and switching elements may equally be employed in conjunction with delay units and a memory for minimizing possible errors due to detection of reversals in current flow caused by transient signals and the like.

What is claimed is:
1. In a battery boost range extender of the type including current sensors for detecting the direction of current flow in a transmission line and switching elements for controllably inserting boost potential into the line to series aid an applied potential to the line, wherein the improvement comprises:
   means for storing a representation of the last past detected direction of current flow; and
   means responsive to said stored representation of said last past direction of current flow and the presently detected direction of current flow for controllably delaying insertion of the boost potential into the line only when there is a reversal in the direction of current flow.
2. In a battery boost range extender of the type including current sensors for detecting the direction of current flow in a transmission line and switching elements for controllably inserting boost potential into the line to series aid an applied potential to the line, wherein the improvement comprises:
   means for controllably delaying insertion of the boost potential into the line including
   memory means for storing a representation of the last past direction of current flow continuously present for more than a prescribed interval, and
   controllable means responsive to outputs from the current sensors and said memory means for inhibiting the switching elements only when the presently detected direction of current flow in the line is different from the last past detected direction of current flow stored in said memory means, wherein insertion of boost potential into the transmission line is delayed only when there is a reversal in the direction of current flow.
3. A range extender as defined in claim 2, wherein the current sensors include elements for detecting current flow in normal and reverse directions in first and second leads of the transmission line, the switching elements are arranged for providing conductive paths for inserting boost potential of first and second polarities into each lead of the transmission line, and wherein said controllable inhibiting means includes
   first enabling means in circuit relationship with the current sensors for detecting normal current flow in the transmission line for controllably enabling ones of the switching elements to insert boost potential into each lead of the transmission line to series aid the detected normal current flow,
   second enabling means in circuit relationship with the current sensors for detecting reverse current flow in the transmission line for controllably enabling ones of the switching elements for inserting boost potential into each lead of the line to series aid the detected reverse current flow,
   first delay means in predetermined circuit relationship with the normal current flow sensors, said first enabling means and said memory means, and being responsive to a continuous output from said normal current flow sensors for yielding a predetermined output at the termination of a prescribed delay interval, said first delay means output being effective for setting said memory means to a prescribed state representative of the detected normal current flow and for providing a conductive path to enable said first enabling means, and
   second delay means in predetermined circuit relationship with the reverse current flow sensors, said second enabling means and said memory means, and being responsive to a continuous output from said reverse current flow sensors for yielding a predetermined output at the termination of a prescribed delay interval, said second delay means output being effective for setting said memory means to a prescribed state representative of the detected reverse current flow and for providing a conductive path to enable said second enabling means, wherein said first and second enabling means are inhibited from responding to outputs from said normal current flow sensors and reverse current flow sensors, respectively, only when the presently detected direction of current flow is different from the last past detected direction of current flow stored in said memory means.

4. A range extender as defined in claim 3 further including means for detecting the presence of a ringing signal and means responsive to an output from said ringing signal detector means for disabling said second enabling means during the ringing interval so that boost potential having a polarity for series aiding normal current flow is insertable during a portion of each cycle of the ringing signal and boost potential having a polarity for series aiding reverse direction of current flow is inhibited from being inserted during the ringing interval.

5. A range extender as defined in claim 4 wherein said disabling means includes means responsive to said output from said ringing signal detector means for inhibiting said second delay means from yielding said predetermined output during the ringing interval.

6. A range extender defined in claim 3, wherein the current sensors include optical isolators, each comprising a light emitting diode and a phototransistor,
   first and second light emitting diodes of first and second optical isolators, respectively, being poled for detecting normal current flow in each lead of the transmission line,
   third and fourth light emitting diodes of third and fourth optical isolators, respectively, being poled for detecting reverse current flow in each lead of the transmission line,
   first and second phototransistors of said first and second optical isolators, respectively, being arranged for supplying a predetermined potential representative of normal current flow in either lead of the transmission line to said first enabling means and said first delay means in response to light emitted from said first and second light emitting diodes, respectively, and
   third and fourth phototransistors of said third and fourth optical isolators, respectively, being arranged for supplying a predetermined potential representative of reverse current flow in either lead of the transmission line to said second enabling means and said second delay means in response to light emitted from said third and fourth light emitting diodes, respectively.

7. A range extender as defined in claim 6, wherein the switching elements for inserting potential of first and second polarities into each lead are phototransistors,
   said first enabling means includes fifth and sixth light emitting diodes connected in series and being responsive to the potential supplied from said normal current sensors and collectively responsive to the state of said memory means and the output from said first delay means for emitting radiant energy to enable ones of the switching element phototransistors for inserting potential in each lead of the transmission line to series aid normal current flow,
   said second enabling means includes seventh and eighth light emitting diodes connected in series and being responsive to the potential supplied from said reverse current sensors and collectively responsive to the state of said memory means and the output from said second delay means for emitting radiant energy to enable ones of the switching element phototransistors for inserting potential in each lead of the transmission line, to series aid the reverse current flow, wherein said fifth, sixth, seventh and eighth light emitting diodes and corresponding ones of said switching element phototransistors are arranged to form fifth, sixth, seventh and eighth optical isolators, respectively.

8. A battery boost range extender which comprises,
   current sensor means for sensing normal and reverse directions of current flow in each lead of a transmission line,
   means for storing a representation of the last past detected direction of current flow of sufficient duration to cause insertion of boost potential into the line,
   switching elements for providing a conductive path to insert boost potential into each lead of the transmission line for series aiding the detected direction of current flow, and
   means for controllably activating ones of said switching elements to insert said boost potential in the line, said activating means including means responsive to said stored representation of the last past direction of current flow and the presently detected direction of current flow for controllably delaying enabling said switching elements only when there is a reversal in the direction of current flow.

9. A battery boost range extender which comprises:
   current sensor means for sensing normal and reverse directions of current flow in each lead of a transmission line;
   switching elements for providing a conductive path to insert boost potential into each lead of the transmission line for series aiding the detected direction of current flow; and
   means for controllably activating ones of said switching elements to insert said boost potential in the line including
   first enabling means in circuit with said normal current flow sensor means,
   second enabling means in circuit with said reverse current flow sensor means,
   a first delay timing circuit connected in predetermined circuit relationship with said first enabling means,
   a second delay timing circuit connected in predetermined circuit relationship with said second enabling means, and
   memory means in predetermined circuit relationship with said first and second enabling means and said first and second delay timing circuits, said memory means having first and second stable states for representing the last past detected direction of current flow in the line, wherein energization of said first and second enabling means in response to signals from said current sensor means is delayed or not by said first and second delay timing circuits, respectively, depending on the present state of the memory means.

10. A range extender as defined in claim 9, wheren each of said first and second timing circuits includes means for providing a conductive circuit path at the termination of a prescribed timing interval for energizing the respective enabling means and for setting said memory means to a prescribed stable state indicative of the detected direction of current flow and the polarity of boost potential inserted into the line upon termination of the prescribed interval.

11. A range extender as defined in claim 10, wherein said timing circuits each includes means responsive to an output signal from corresponding ones of said current sensor means for generating a prescribed output upon termination of a predetermined timing interval, said timing interval being reinitiated when application of said output signal is interrupted or terminated.

12. The range extender as defined in claim 10, wheren said first and second enabling means each includes radiant energy emitting means and said switching elements include radiant energy responsive means associated on a one-to-one basis with said radiant energy emitting means.

13. The range extender as defined in claim 12, wherein said radiant energy emitting means are light emitting diodes and said radiant energy responsive means are phototransistors.

14. The range extender as defined in claim 9, further including means for detecting the presence of a ringing signal applied to the transmission line and means responsive to said ringing signal detecting means for controllably disabling a predetermined one of said enabling means during the ringing interval so that boost potential of a first polarity is inserted in the line during a portion of each cycle of the ringing signal to series aid current flow caused by a direct current potential applied to the line and insertion of boost potential of a polarity opposite to said first polarity is inhibited from being inserted during the remaining portion of each cycle of said ringing signal.

15. The range extender as defined in claim 14 wherein said disabling means includes means for inhibiting operation of the delay timing circuit associated with said predetermined one of said enabling means during the presence of the ringing signal.

* * * * *